US010805765B1

(12) United States Patent
Poole et al.

(10) Patent No.: US 10,805,765 B1
(45) Date of Patent: Oct. 13, 2020

(54) TIME-BASED CHECK-IN FOR MOBILE-DEVICE APPLICATIONS

(71) Applicant: Amazon Technologies, Inc., Seattle, WA (US)

(72) Inventors: Margaret Draughon Poole, Seattle, WA (US); Karen Arango, Seattle, WA (US); Smita Joshi, Issaquah, WA (US); Siddharth Lathia, Kirkland, WA (US); Bilyana Slavova, Redmond, WA (US); Jiajun Zhao, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 238 days.

(21) Appl. No.: 15/590,891

(22) Filed: May 9, 2017

(51) Int. Cl.
*H04W 24/00* (2009.01)
*H04W 4/02* (2018.01)
*H04M 1/725* (2006.01)
*H04L 29/06* (2006.01)
*G06K 7/14* (2006.01)
*G06K 7/10* (2006.01)
*H04W 4/60* (2018.01)
*H04W 88/02* (2009.01)

(52) U.S. Cl.
CPC ........ *H04W 4/023* (2013.01); *G06K 7/10722* (2013.01); *G06K 7/1417* (2013.01); *H04L 69/28* (2013.01); *H04M 1/72583* (2013.01); *H04W 4/60* (2018.02); *H04M 2250/10* (2013.01); *H04W 88/02* (2013.01)

(58) Field of Classification Search
CPC ........ H04L 29/08108; H04M 1/72519; H04M 1/72522; H04M 1/72533; H04W 4/02; H04W 8/245; H04W 48/04; H04W 64/00
USPC .... 455/414.1–414.4, 418–420, 456.1–456.6, 455/457, 550.1, 556.1
See application file for complete search history.

(56) References Cited

U.S. PATENT DOCUMENTS

| 9,117,106 | B2 | 8/2015 | Dedeoglu et al. | |
| 9,235,928 | B2 | 1/2016 | Medioni et al. | |
| 9,473,747 | B2 | 10/2016 | Kobres et al. | |
| 2013/0284806 | A1 | 10/2013 | Margalit | |
| 2014/0063311 | A1* | 3/2014 | McCauley | H04N 1/00137 348/333.01 |
| 2015/0041530 | A1* | 2/2015 | Burkhart | G06K 19/06037 235/375 |
| 2015/0088607 | A1* | 3/2015 | Georgoff | G06Q 30/0246 705/7.31 |
| 2015/0294362 | A1* | 10/2015 | Royyuru | G06Q 30/0261 705/14.58 |
| 2015/0310522 | A1* | 10/2015 | Kashima | G06Q 30/06 705/26.61 |

(Continued)

*Primary Examiner* — Matthew W Genack
(74) *Attorney, Agent, or Firm* — Lee & Hayes, P.C.

(57) ABSTRACT

This disclosure describes techniques for determining when to transition a service-provider application between an in-store mode of operation and an online mode of operation using time as a proxy for location of a mobile device executing an application. When a user arrives at a physical location of the service provider, the user may provide an indication of this arrival via the application. In response, the application may transition from the online mode of operation to the in-store mode of operation. Further, the application may set a timer for a predefined amount of time and, after this amount of time elapses, may transition from the in-store operation mode back to the online operation mode.

20 Claims, 11 Drawing Sheets

(56) References Cited

U.S. PATENT DOCUMENTS

| | | | |
|---|---|---|---|
| 2016/0146614 A1* | 5/2016 | Gupta | G06Q 30/06 |
| | | | 701/461 |
| 2017/0278125 A1* | 9/2017 | Tietzen | G06Q 30/0229 |
| 2017/0294054 A1* | 10/2017 | Rosenbaum | F02D 41/2406 |
| 2017/0373852 A1* | 12/2017 | Cassin | G06Q 20/12 |

* cited by examiner

TIME-BASED CHECK-IN FOR MOBILE-DEVICE APPLICATIONS

BACKGROUND

Retailers, wholesalers, and other product distributors typically maintain an inventory of various items that may be ordered, purchased, leased, borrowed, rented, viewed, and so forth, by clients or customers. In some instances, these product distributors allow users to acquire items at a physical stores (i.e., brick-and-mortar locations), as well as to order the items using an electronic device (i.e., online or via a mobile application). For instance, physical stores maintain inventory in customer-accessible areas, such as in a shopping area, and customers are able to pick items from inventory and take them to a cashier for purchase, rental, and so forth. Conversely, users may view details about the items on mobile devices and may purchase the items if so desired. In general, these two different techniques for allowing users to acquire items are discrete from one another, even when provided by the same merchant.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
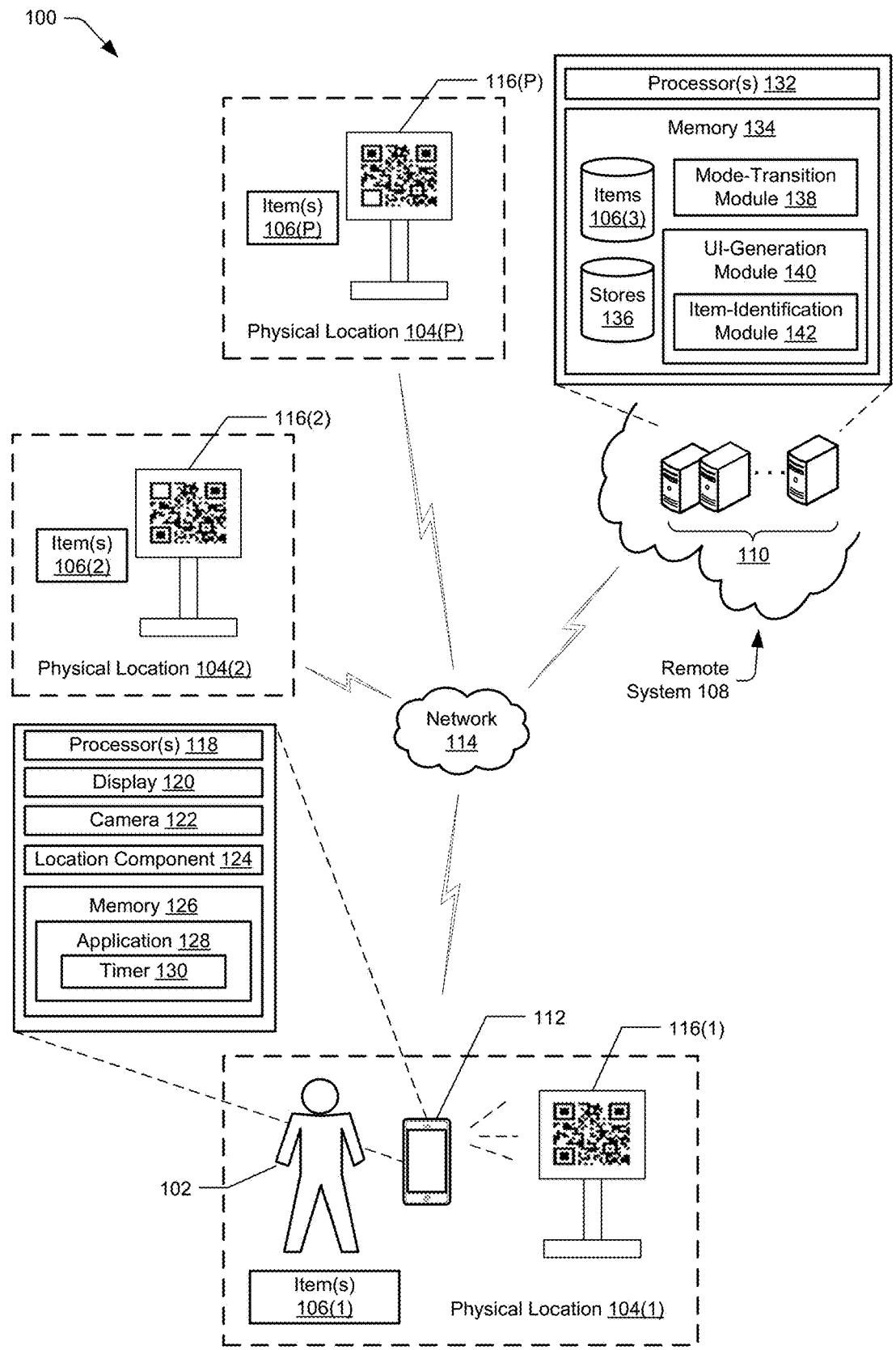
FIG. 1A illustrates an example environment that includes a user and a mobile device of the user at a physical location of a service provider that offers items for acquisition both at the physical location as well as via an e-commerce application executing on the device. In some instances described below, the user may use the e-commerce application to indicate that she is located at the physical location of the service provider and, in response, the application may transition from operating in a first mode (e.g., an online mode) to operating in a second mode (e.g., an in-store mode), which may aid the user's shopping experience at the physical location of the service provider. In this example, the user provides the indication may capturing an image of a code, e.g., a two-dimensional barcode or the like, that uniquely identifies the physical location of the service provider.

This disclosure describes systems and techniques operating an application in two or more different modes, as well as determining when to implement each mode and for how long implement the modes. In one example, a service provider provides an application that may be executed on client devices and may aid users in learning about and acquiring items offered for acquisition from the service provider. For instance, the application may comprise an e-commerce application (e.g., a downloadable application, a website executable on a browser, etc.) from which users may learn about items and purchase, rent, lease, or otherwise obtain items. These items may comprise tangible items that may be delivered to a location associated with a user after purchase or the like, or may comprise intangible items (e.g., electronic books, music, applications, etc.) that may be downloaded onto one or more client devices.

In addition, the service provider may operate one or more physical locations, at which the user may acquire some or all of the same items. That is, the service provider may operate one or more brick-and-mortar locations that may offer tangible and/or intangible items for acquisition. In some instances, the application provided by the service provider may be configured to operate in multiple modes based on one or more criteria. In one example, the application may be configured to operate in a default, e-commerce mode, while in another example the application may be configured to operate in an "in-store mode" for aiding a user operating the application when located at a physical location of the service provider.

In some instances, the application may transition from operating in the default mode to the in-store mode in response to the application receiving an indication that the mobile device upon which the application is executing is located at a physical location of the service provider. For instance, when the mobile device is within a threshold distance of a geographical location of a particular physical location of the service provider, the application may transition from the e-commerce mode to the in-store mode. In some instances, the mobile device may be deemed to be located at the physical location of the service provider (e.g., within the threshold distance of the location) based on geolocation data received from the mobile device or another device. For instance, a global positioning system (GPS) unit or other location component of the mobile device may determine coordinates of the mobile device, which may be used to determine when the device is within the threshold proximity of the physical location of the service provider. The application, a remote system, or any other application/device may make this determination and, in response, may instruct the application to transition from the e-commerce mode to the in-store mode.

In another example, a user of the mobile device may utilize the service-provider application to manually "check-in" to the physical location of the service provider. For instance, the application may provide a graphical user interface (GUI), a voice user interface (VUI), or the like to enable the user of the application to indicate when she is located at a physical location of the service provider. For example, the application may implement a GUI that includes a UI element that is selectable to indicate that the mobile device is located at the physical location of the service provider. In instances where the service provider includes multiple physical locations, the application may include multiple UI elements, each selectable and each associated with a particular one of the multiple physical locations.

In yet another example, the mobile device may capture an image, sound, video, and/or other type of content using one or more input components of the mobile device that may be used to determine that the mobile device is located at the physical location of the service provider. For example, each physical location of the service provider may include a physical image (e.g., barcode or other type of image) that uniquely identifies the particular physical location. The mobile device may capture an image (e.g., when operating within the service-provider application) of the code or other unique identifier, which may then be used to determine that the mobile device is present at the physical location of the service provider. In instances where the service provider has multiple physical locations, each code or image may uniquely identify a particular one of the physical locations. In other instances, each code or image may identify the service provider without specifically identifying a particular location of the service provider. Further, while the above examples describes a code, it is to be appreciated that the other content may be used to uniquely identify the physical location of the service provider, such as an image of the building of the physical location, a video of the physical location, a sound or song associated with the physical location, or the like.

While a few examples have been provided, it is to be appreciated that the techniques may determine that the mobile device is present at the physical location of the service provider in one or more other ways. In response to making this determination, meanwhile, the application may transition from operating in the default mode to operating in an in-store mode that includes one or more features not available in the default, e-commerce mode and that are intended to supplement the experience of the user at the physical location of the service provider. For example, the in-store mode may show details about items only available at the particular physical location at which the mobile device is located, rather than simply details about all possible items offered by the service provider online and/or at other locations. For example, in response to receiving a search query when operating in in-store mode, the application may generate search results corresponding to items that are available for acquisition at the physical location of the service provider (while, for example, filtering out otherwise matching results that are only available online and/or at other physical locations of the search provider). Further, the application may provide different details, or a different amount of details, about the items than would be presented when the application is operating in the e-commerce mode. For instance, in in-store mode, the application may show different prices for items available in the physical location, and fewer or more details, some of which may be unique to the physical location, such as a location of a particular item at the physical location (e.g., the section of the store, the row of the store, directions to the item in the store from the current location of the mobile device, etc.).

Furthermore, in some instances, when operating in the first mode, the application may provide a UI element that is selectable to present additional details that are available for viewing when the application is operating in the default, e-commerce mode. For example, while the application may filter search results down to only items available at a physical location when the application receives a search query while the device is located at the physical location, the application may include a UI element that, when selected, results in the device presenting the additional details that would be presented for that particular search query if the device were operating in the default, e-commerce mode. That is, when a user enters a search query into the application while the application is operating in the first, in-store mode, the application may generate search results for items that are available at the physical store. However, the application may present a UI element that is selected to view search results that would be presented if the application were operating in the default, e-commerce mode, such as search results for the items that are available online (rather than just at the physical location). When the user selects to view the default, e-commerce search results, the application may present these search results, along with a UI element to return to the UI presenting only the search results for the items available in-store.

The in-store mode may offer other features that differ from features of the application when executing in the default, e-commerce mode. For example, the in-store mode may implement UIs that include recommendations for items that are available at the physical location of the service provider. For example, if a mobile device is displaying information regarding a particular item that is available for acquisition at the physical location of the service provider (e.g., a particular book), the UI may additionally display one or more additional items that are related to the particular item and available for acquisition at the physical location of the service provider. The additional items may comprise items that are related to the particular item being viewed, items recommended for the user associated with the mobile device, or the like.

In some instances, the application may remain in the in-store mode for a designated amount of time following entry of the application into the in-store mode. That is, when the application transitions from operating in the default, e-commerce mode to the in-store mode, the application, a remote device, or another application/device may set a time for a predefined amount of time. The application may then remain in the in-store mode for the predefined amount of time, but may transition back to the default, e-commerce mode after expiration of the predefined amount of time. For example, the application may utilize a local timer of the device for determining when the transition back to the default mode. In another example, a remote server device of the service provider may maintain the timer and, upon expiration of the default amount of time, may instruct the application on the mobile device to transition back to the default, e-commerce mode.

In some instances, the application may be configured to remain in the in-store mode for the predefined amount of time in instances where the user manually checks into the physical location, while refraining from utilizing the timer in instances where the application transitions to the in-store mode based on GPS or other location data of the mobile device. Instead, in instances where the application transitions to the in-store mode based on geolocation data of the mobile device, the application may remain in the in-store mode until the mobile device exits the physical location of the service provider (e.g., is no longer within the threshold distance of the physical location of the service provider). However, in instances where the user manually indicates that the mobile device is located at the physical location (e.g., by capturing an image associated with the physical location, using a menu or other UI element to check into the physical location, etc.), the application may remain in the in-store mode for the predefined amount of time. That is, because in these instances the actual location of the mobile device may be unknown, a timer may be utilized to estimate an amount of time that the mobile device is likely to remain at the physical location of the service provider. In some instances, the amount of time may be determined based on a history of the user (e.g., the amount of time typically spent at different service provider locations), a time of day, a day of week, a type of service provider, or the like.

The techniques described herein may apply in an array of environments and may include, but is not limited to, merchant retail stores, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

FIG. 1A illustrates an example environment 100 that includes a user 102 and a mobile device 112 of the user 102 at a physical location 104(1) of a service provider that offers items for acquisition both at multiple physical locations 104(1), 104(2), . . . , 104(P) as well as via an e-commerce application 128 executing on the device 112. In some instances described below, the user 102 may use the e-commerce application 128 to indicate that she is located at the physical location 104(1) of the service provider and, in response, the application 128 may transition from operating in a first mode (e.g., an online mode) to operating in a second mode (e.g., an in-store mode), which may aid the user's shopping experience at the physical location 104(1) of the service provider.

As illustrated, the service provider operates the multiple physical locations 104(1)-(P), which respectively offer items 106(1), 106(2), . . . , 106(P) for acquisition. That is, each of the physical locations 104(1)-(P) includes a respective inventory of items 106(1)-(P) offered for purchase, rental, lease, or the like by the user 102 and/or other users. In addition, the service provider operates a remote system 108 comprising one or more server computing devices 110, which hosts a datastore 106(3) identifying one or more items offered for acquisition via the application 128 (e.g., a web browser, a downloaded application, etc.). Therefore, the user 102 is able to acquire items directly from the physical locations of the service provider or may interact with the remote system 108 over a network 114 using the application 128 to purchase or otherwise acquire items from the service provider. In some instances, the datastore 106(3) stores information associated with the available items, including whether the items are available online and/or at one or more of the physical locations 104(1)-(P). This information may be used to provide context-relevant information, such as search results for items 106(1) available at the physical location 104(1) when the user 102 is located at the physical location 104(1), and so forth. In addition, the information stored in the datastore 106(3) may be useful in providing recommendations for other items available the current physical location, and the like.

While illustrated as being remote from the physical (e.g., retail) location of the service provider, the servers 110 may be physically present at one or more of these physical locations, may be accessible by the network 114, or a combination of both. The servers 110 do not require end-user knowledge of the physical location and configuration of the system that delivers the services. Common expressions associated with the servers 110 may include "on-demand computing," "software as a service (SaaS)," "platform computing," "network-accessible platform," "cloud services," "data centers," and so forth. Services provided by the servers 110 may be distributed across one or more physical or virtual devices. The servers 110 may include one or more hardware processors 132 (processors) configured to execute one or more stored instructions. The processors 132 may comprise one or more cores. The servers 110 may include one or more input/output (I/O) interface(s) to allow the processor 132 or other portions of the servers 110 to communicate with other devices. The I/O interfaces may comprise Inter-Integrated Circuit (I2C), Serial Peripheral Interface bus (SPI), Universal Serial Bus (USB) as promulgated by the USB Implementers Forum, RS-232, and so forth.

As shown in FIG. 1A, the servers 110 may also include one or more memories 134. The memory 134 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 134 provides storage of computer-readable instructions, data structures, program modules, and other data for the operation of the servers 134. A few example functional modules are shown stored in the memory 134, although the same functionality may alternatively be implemented in hardware, firmware, or as a system on a chip (SOC).

Returning to the example of FIG. 1A, the user 102 may utilize her mobile device 112 while shopping at the physical location 104(1) of the service provider. As illustrated, in this example the physical location 104(1) is associated with and includes an image 116(1) that uniquely identifies the physical location 104(1). FIG. 1A further illustrates that the physical locations 104(2)-(P) may similarly be associated with respective unique images 116(2), . . . , 116(P). As described in further detail below, the user 102 may utilize the mobile device 112 to capture image data of the image 116(1) for indicating that the user 102 (and/or the mobile device 112) is located at the physical location 104(1) of the service provider.

As illustrated, the mobile device 112 may include one or more processors 118, a display 120 and/or other output components, a camera 122 and/or other input components, a location component 124 (e.g., a GPS unit, etc.), and memory 126. The memory 126 may store an application 128, which may utilize a timer 130. In some instances, the application 128 may comprise a downloaded application provided by the service provider, while in other instances, the application may represent a website being rendered on a web browser of the mobile device 112.

In this example, the user 102 may operate the camera 122 of the mobile device 112 to capture image data of the image 116(1), which may be used to indicate that the device 112 is located at the physical location 104(1) and, thus, to cause the application 128 executing on the device 112 to transition from the first mode to the second mode. For example, the camera 122 may capture the image data and send the image data to the servers 110 of the remote service 108 associated with the service provider.

As illustrated, the memory 134 of the servers 110 of the service provider store or otherwise have access to the datastore 106(3) indicating the inventory of items available "online", a datastore 136 storing information regarding physical locations 104(1)-(P) of the service provider, a mode-transition module 138, and a UI-generation module 140. As illustrated, the UI-generation module 140 includes an item-identification module 142.

Upon receiving the image data captured by the camera 122 of the mobile device 112 of the user 102, the mode-transition module 138 may utilize image-recognition techniques to identify the code image 116(1) represented in the image data. Further, the mode-transition module 138 may access the datastore 136 to determine that the identified image is associated with the physical location 104(1). In response, the mode-transition module 138 may send an instruction to the application 128 to transition from a first mode into a second mode. For instance, the module 138 may send a message instructing the application to transition from the default, e-commerce mode to the in-store mode. Upon receiving the instruction, the application 128 may transition to the second mode. Further, while FIG. 1 describes the mode-transition module 138 causing the application 128 to make the transition, in other instances the device 112 may identify the code image 116(1) and may cause the application transition to the second mode.

In addition to causing the application 128 to transition to the second mode, the mode-transition module 138 may set a timer executed on the remote system 108 for a predefined amount of time or may instruct the application 128 to set the timer 130 for the predefined amount of time. The application 128 may then operate in the second mode until the predefined amount of time lapses. That is for a certain amount of time after the transitioning the second mode (e.g., five minutes, thirty minutes, two hours, etc.), the application 128 may operate in the second mode should the user 102 utilize the application.

In some instances, use of the time acts as a proxy for location. Because some users prefer not to turn on location services on their mobile devices (that is, do not like to turn on or keep on their location component 124, such as a GPS unit), and might forget to manually reset the application back to the first mode if only a manual interface element was provided, the use of the timer 130 functions to estimate the amount of time that the user 102 remains at the physical location. Therefore, the amount of time may be based on an average or median amount of time that users of the service provider have remained at the physical location, based on historical data associated with the user 102, or the like.

The memory 134 of the servers 110 may further execute the UI-generation module 140, which may generate data for causing display of UIs on the mobile device 112 via the application 128. For instance, as the user 102 utilizes the application 128, the user 102 may request information about different items, either available at the physical location 104(1), another one of the physical locations 104(2)-(P), or available online via the remote system 108. Upon receiving these requests, the UIOgenerate module 140 may generate the data for display on the display 120 of the mobile device 112.

In some instances, the UI-generation module 140 retrieves and sends different data based on whether the application 128 is operating in the first mode, the second mode, or another mode. For instance, when the application sends a request, the request may include an indication of the current mode the application is operating in. Or, the remote system 108 may store the current mode of the application 128 of the particular mobile device 112, potentially along with an amount of time that the application 128 is scheduled to operate in that particular mode. The UI-generation module 140 may then retrieve and send the data for the particular UI based on the request of the user 102 and the current mode of the application 128.

For instance, if the application 128 is operating in a default, e-commerce mode and the user 102 requests enters a search query into the application, the UI-generation module 140 may generate search results and data for display via the application 128 based on information found in the datastore 106(2). That is, the UI-generation module 140 may generate search results based on items that are available for acquisition online over the network 114. However, if the application 128 is operating in the in-store mode and the user 102 provides a search query, the UI-generation module may generate search results using the datastore 106(1) representing items that are available at the particular physical location 104(1) of the service provider at which the user 102 is located. It is noted that while FIG. 1A illustrates the respective datastores 106(1)-(P) at different locations, it is to be appreciated that they may be located on the servers 110 or at other locations. Further, rather than maintaining discrete datastores, in some instances a single datastore may be used (or any other number) and attributes may be stored in association with the items, indicating locations at which items are available (or unavailable) for acquisition.

In addition to providing data for rendering UIs that are specific to a particular location at which the mobile device 112 is located, the UI-generation module 140 includes the item-identification module 142. The item-identification module 142 may identify items to recommend to the user 102 based on the location of the user 102 and, more specifically, based on the inventory at the particular location. For instance, when a user requests to view information about a particular book on the application 128 while the application is located at the physical location 104(1), the item-identification module 142 may identify one or more items to also recommend to the user 102 that are also available at the physical location 104(1) of the service provider.

Figure 1B:
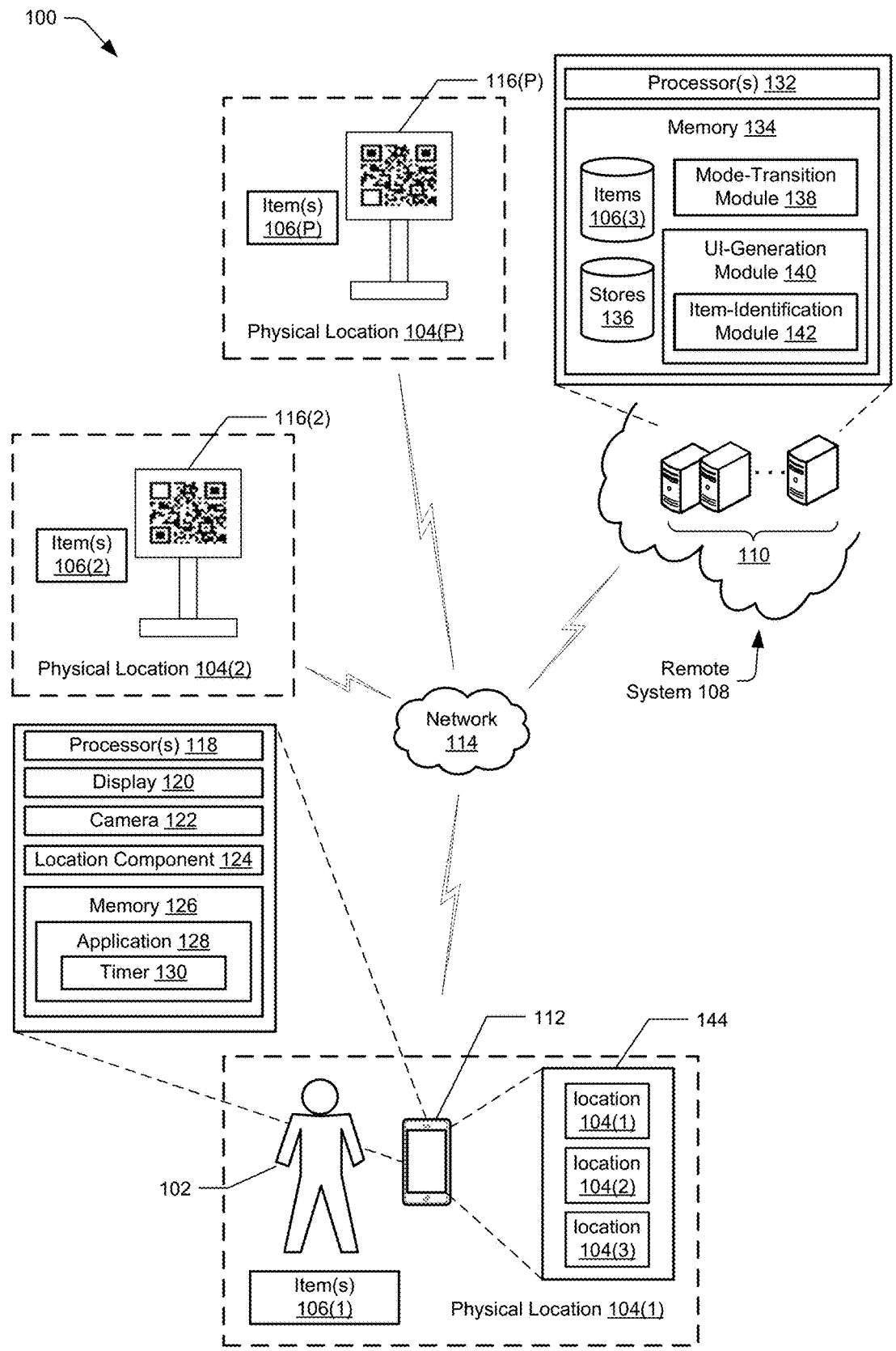
FIG. 1B illustrates the example environment of FIG. 1A. In this instance, however, the user indicates that she is at the physical location of the service provider via a user interface (UI) of the application provided by the service provider.

FIG. 1B illustrates the example environment 100 of FIG. 1A. In this instance, however, the user 102 indicates that she is at the physical location 104(1) of the service provider via a UI 144 of the application 128 provided by the service provider. As illustrated, the application 128 may provide the UI 144, which may include UI elements that, when selected, cause the application to send information to the remote system 108 indicating that the mobile device is located at a particular physical location of the service provider. In response, the mode-transition module 138 may cause the application to transition from the default, e-commerce mode to the in-store mode. FIG. 3B illustrates additional details regarding an example instance of the UI 144.

Figure 2:
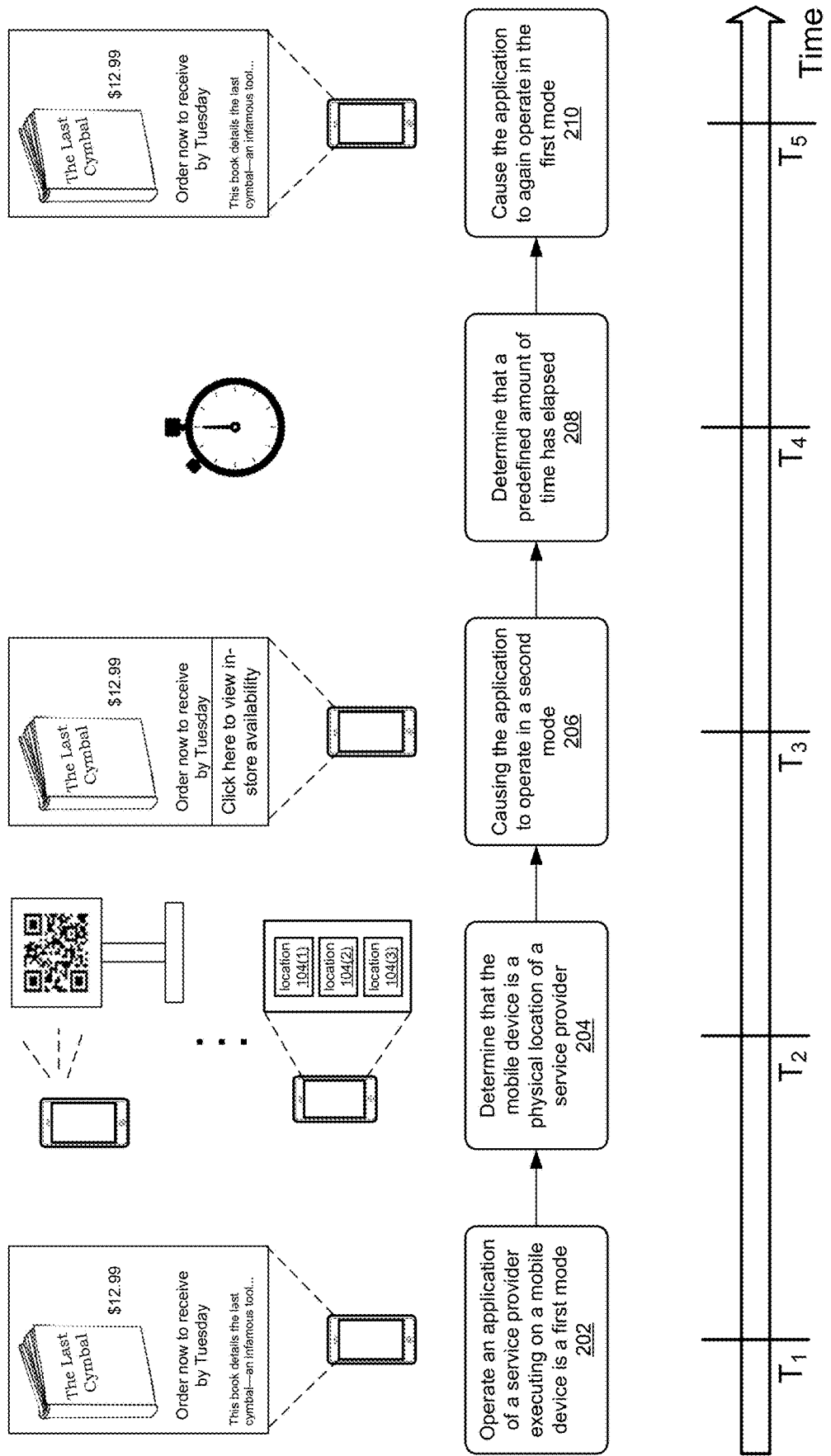
FIG. 2 illustrates an example process for operating an application of a service provider in a first mode, determining that a mobile device executing the application is located at a physical location of the service provider, and, in response, transitioning the application to a second mode. In addition, the process includes determining that a predefined amount of time has lapsed since causing the transition and, in response, causing the application to transition back to the first mode.

FIG. 2 illustrates an example process 200 for operating an application of a service provider in a first mode, determining that a mobile device executing the application is located at a physical location of the service provider, and, in response, transitioning the application to a second mode. In addition, the process includes determining that a predefined amount of time has lapsed since causing the transition and, in response, causing the application to transition back to the first mode.

At 202, a mobile device, such as the device 112, operates an application of a service provider in a first mode. In the example illustration, when in the first mode, the application displays information about a particular book and includes that the user is able to purchase the book for delivery to a location associated with the user. As such, the first mode may comprise an e-commerce mode in which the user may request to acquire items online using the application, with the service provider causing later delivery of the items to the location of the user (in the case of tangible items).

At 202, however, the process 200 determines that the mobile device is located at a physical location of the service provider. For instance, the remote system 108 of the service may receive data indicative of the user being located at a particular brick-and-mortar location of the service provider. In some instances, this indication comprises image data captured by a camera of the mobile device and representing a code or other unique identifier associated with a physical location of the service provider. In another example, the user may select a UI element associated with a particular physical location to indicate that the mobile device and user are located at that particular location. In other instances, the remote system 108 may receive data from a location component onboard the mobile device or may otherwise receive location data regarding the current location of the mobile device to determine that the device is located at the particular physical location.

Regardless of the how the determination is made, at 206 the process 200 causes the application to operate in a second mode. For example, the application on the device may transition from the e-commerce mode to an in-store mode. When operating in the latter mode, the application may display details on one or more UIs that are tailored to the particular physical location of the service provider. FIG. 2, for instance, illustrates a UI about an example book that is available online from the service provider, as well as a UI element that is selectable to cause the UI to present details regarding the in-store availability of the book at the store of the service provider at which the device is currently location.

At 208, the process 200 determines that a predefined amount of time has elapsed since the transitioning of the application to the second mode. For instance, a timer operating on the mobile device, a remote server, or elsewhere may have been set for a predefined amount of time and may have elapsed. At 210, and in response to the predefined amount of time elapsing, the mobile device is transitioned from the second mode back into the first mode. As described above, the timer may, in some instances, act a proxy for location when the location services of the mobile device are unavailable to the service provider. That is, because the service provider might not receive an indication when the mobile device exits the physical location of the service provider, the amount of time that the user is expected to remain at the location after indicating her presence at the location may be estimated and the application may be configured to remain in the in-store mode for this estimated amount of time.

Figure 3A:
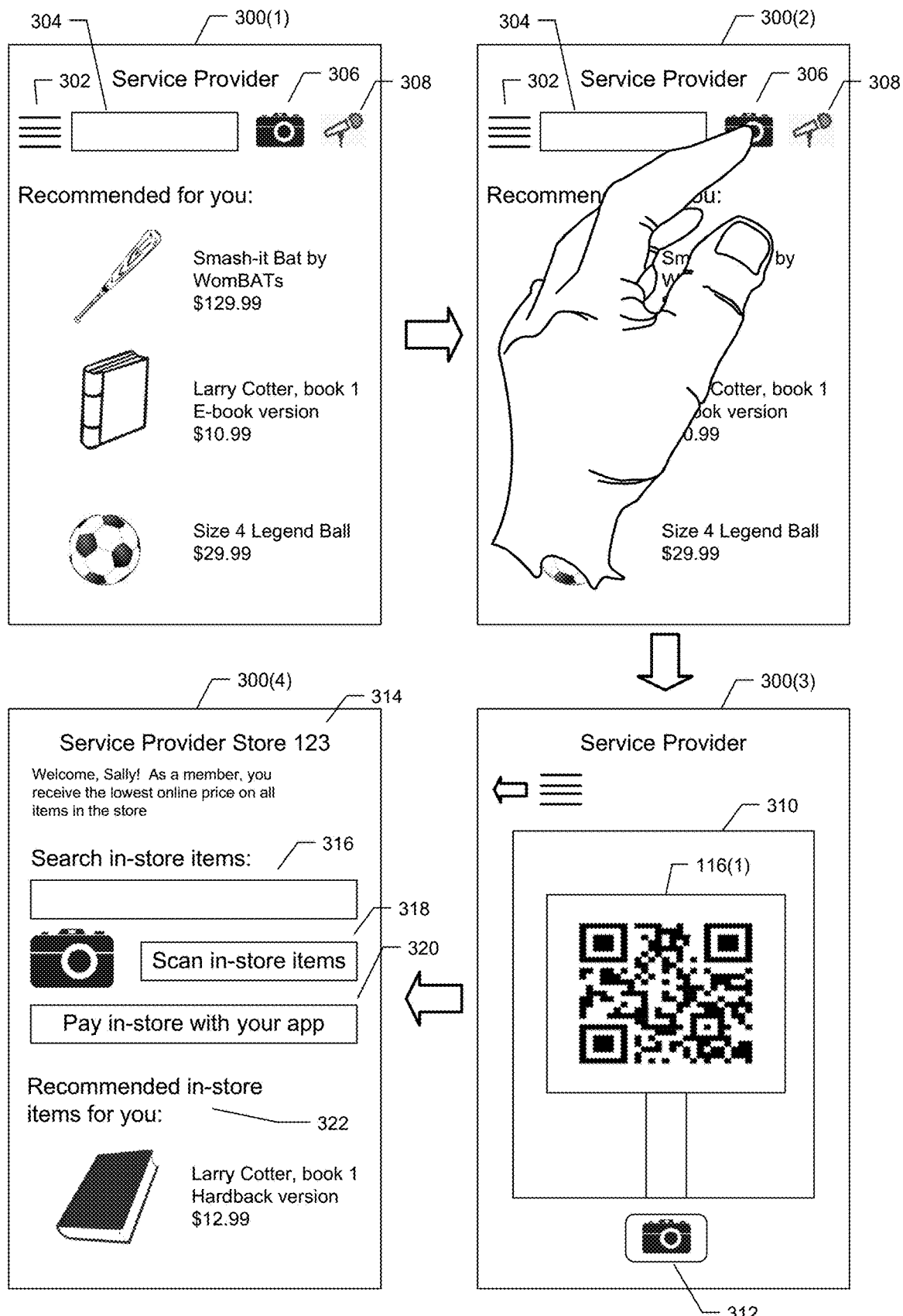
FIG. 3A illustrates a series of example UIs that the service-provider application may implement to allow the user to capture an image of a code or other image that uniquely identifies the physical location of the service provider to allow the user to indicate that she is located at the physical location.
Figure 3B:
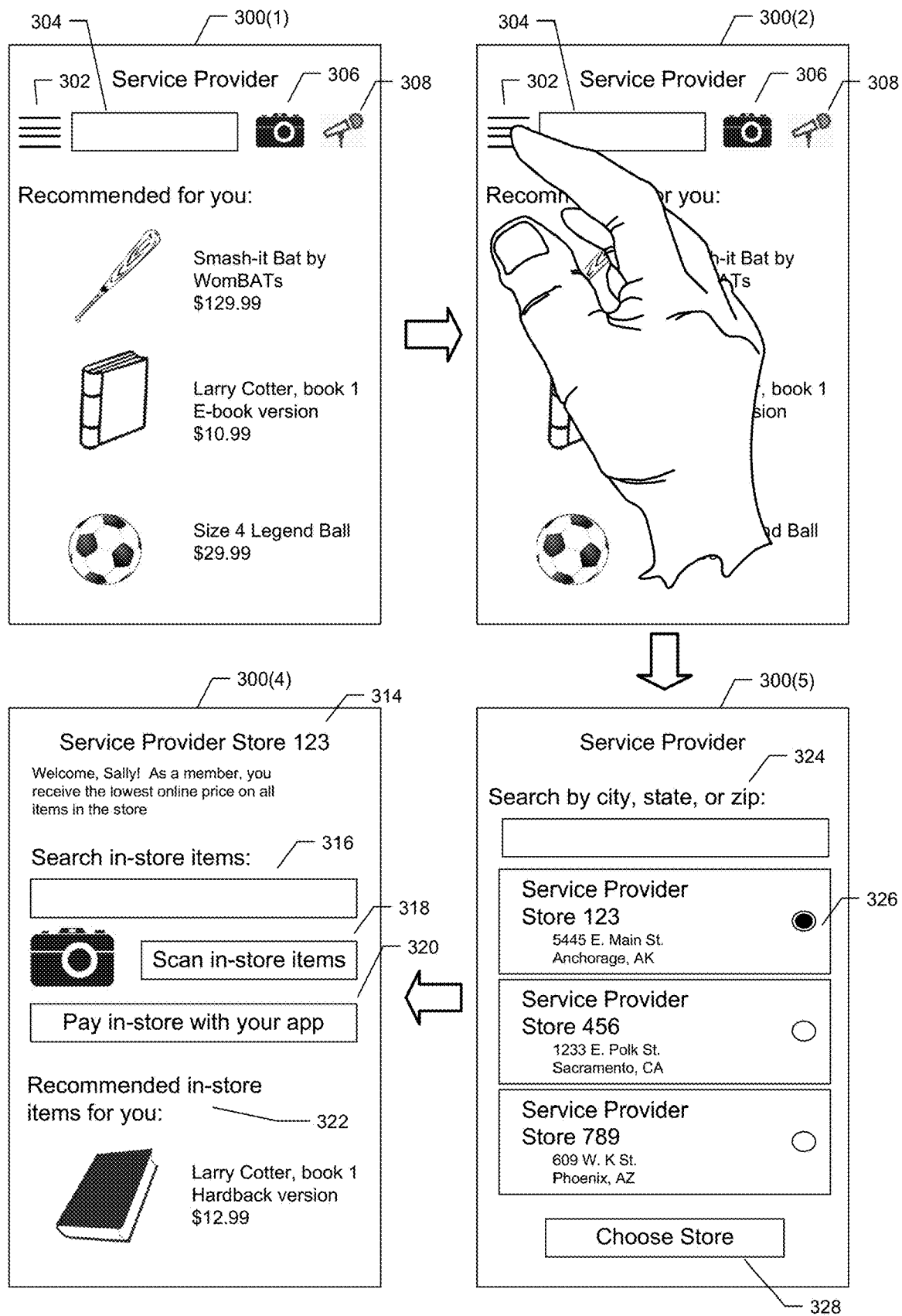
FIG. 3B. illustrates a series of example UIs that the service-provider application may implement to allow the user to manually "check-in" using the application to indicate that she is located at the physical location of the service provider.

FIG. 3A illustrates a series of example UIs that the service-provider application 128 may implement to allow the user 102 to capture an image of a code or other image that uniquely identifies the physical location of the service provider to allow the user 102 to indicate that she is located at the physical location 104(1). As illustrated, a first UI 300(1) comprises an example home page of the service provider and includes a menu 302, a search box 304 for entering search queries via a keyboard, a camera icon to allow a user to turn on the camera, and a microphone icon 308 for receiving a search query via voice. In addition, the example UI 300(1) includes example details, such as items recommended for the particular user that are available (in this case, online) from the service provider.

A second UI 300(2) illustrates that the user may select the camera icon 306, which may cause the application to present the UI 300(3). As this UI illustrates, in response to selection of the camera icon 306, the application may launch the camera of the device and may include a viewing window 310 corresponding to the view of the camera. In some instances, the user of the device may then aim the camera at an image that is present at a physical location of the service provider and that uniquely identifies that location. In this example, for instance, the physical location 104(1) includes a sign 116(1) at an entry point of the store that may instruct users to scan the code from their service-provider application. In response to capturing such an image, the image may be sent to the remote system 108 of the service provider, which may analyze the image to identify the code, which in turn may be used to identify that the mobile device is located at the particular physical location.

In response to making this determination, the application may be instructed to present UI 300(4). As illustrated, this UI 300(4) comprises a home page 314 associated with the physical location of the service provider (example store "123"). This UI 300(4) may include a search box 316 for allowing a user to search for information regarding in-store items, a camera icon 318 to allow a user to scan items at the store to view additional information (e.g., price) about the items, and an icon 320 for allowing a user to pay for items that the physical location using data stored at the remote system 108 and presentable on the mobile device of the user. Further, the example 300(4) may include details 322 regarding one or more items that are available in-store and that are recommended for the particular user associated with the device.

FIG. 3B. illustrates another series of example UIs that the service-provider application may implement to allow the user to manually "check-in" using the application to indicate that she is located at the physical location of the service provider. Again, this figure begins with the first UI 300(1). However, on UI 300(2), the user selects the menu icon 302, causing the application to present a UI 300(5) (either directly or after navigating one or more additional menus). As illustrated, the UI 300(5) includes a text box 326 that allows the user to enter a city, state, zip (or the like) for the purpose of identifying physical locations of the service provider. In addition, the UI 300(5) may include respective icons 326 that are selectable and are associated with different physical locations of the service provider. In this example, the service provider maintains locations at Anchorage, Ak., Sacramento, Calif., and Phoenix, Ariz. In this example, the user of the mobile device indicates that she is currently located at the Anchorage store and makes this selection via the icon 326 and a select-store icon 328.

In response to the user making this selection, the application presents example UI 300(4). Similar to the discussion of FIG. 3A above, this UI 300(4) comprises an in-store home page that may be tailored, in part, based on inventory of the particular physical location and information regarding the user of the mobile device.

Figure 4:
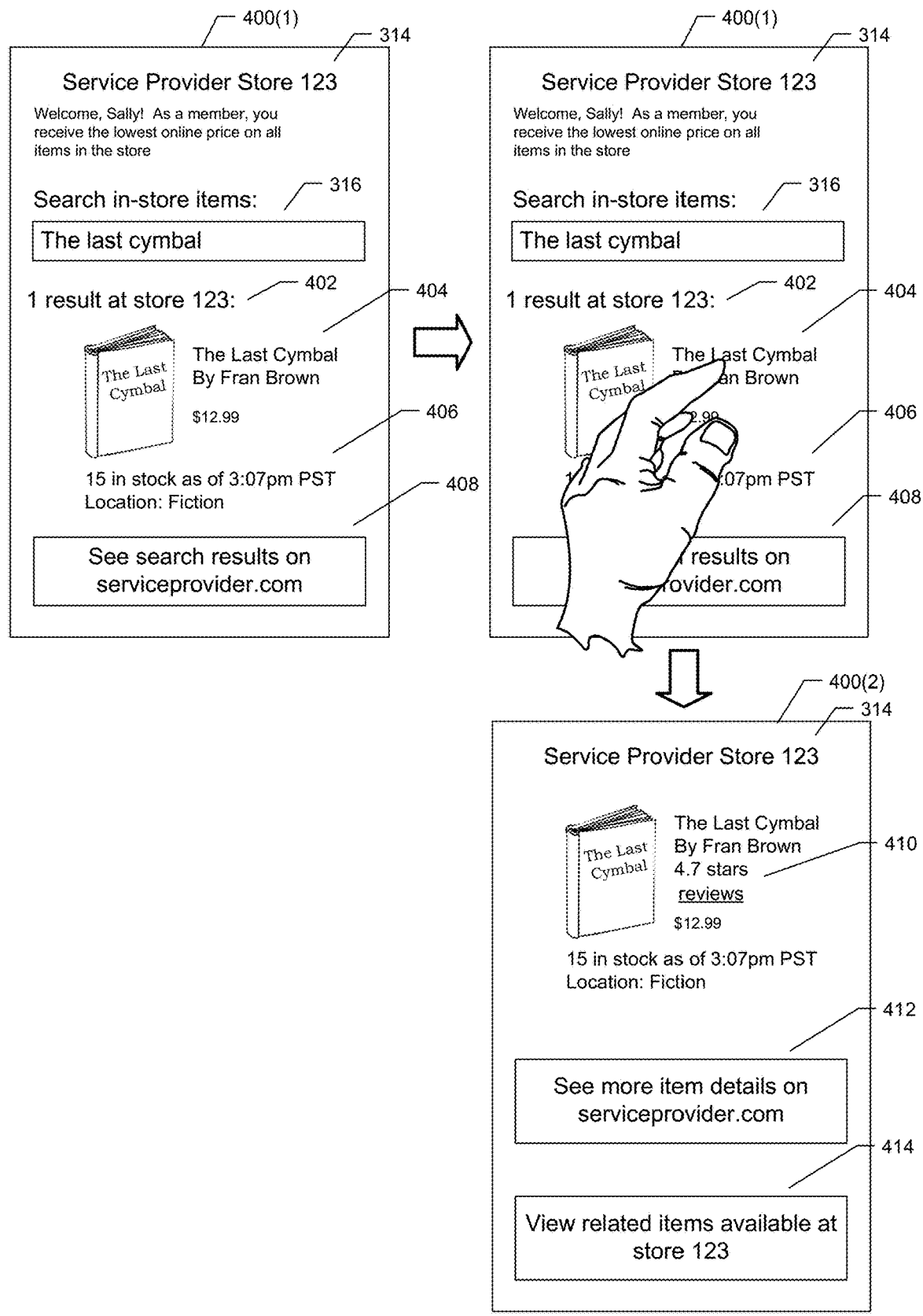
FIG. 4 illustrates a series of example UIs that the service-provider application may implement when operating in the second mode of operation (e.g., the in-store mode). In this example, in response the user entering a search query, the application provides search results of items that are available at the physical location of the service provider, as well as an option to view additional details via the first mode of operation of the application (e.g., the e-commerce mode).

FIG. 4 illustrates a series of example UIs that the service-provider application may implement when operating in the second mode of operation (e.g., the in-store mode). In this example, in response the user entering a search query, the application provides search results of items that are available at the physical location of the service provider, as well as an option to view additional details via the first mode of operation of the application (e.g., the e-commerce mode).

FIG. 4 begins with a UI 400(1), which illustrates that a user of the device has entered a search query ("the last cymbal") into the search box 316. In response, the UI 400(1) illustrates search results 402 that are tailored to the particular physical location that the mobile device is currently located at. That is, in response to receiving the search query, the remote system 108 may perform a search of inventory available at the service provider to generate initial search results, and then may filter the initial search results to remove items that are not available at the location of the mobile device, resulting in the in-store search results 402. The remote system may then send data for presenting the in-store search results 402 to the mobile device. As illustrated, the example in-store search results include an indication 404 of a particular item matching the search query and available at the store, an indication 406 of a number of the item in stock and its location in the store, as well as an icon 408 for allowing the user to view the search results in the e-commerce mode. That is, the icon 408 is selectable to cause the application to present search results that do not take into the account the current location of the mobile device by, for example, filtering out items that are not available in the current store of the service.

In the illustrated example, however, the user selects information regarding the book "The Last Cymbal" from the in-store search results 402 from the UI 400(1). In response, the application presents a UI 400(2) which illustrates details about the selected item. In some instances, the details about the item are different when viewed in the in-store mode than when viewed in the e-commerce mode. In this example, the UI 400(2) includes details 410 about the item (e.g., star rating, a number left in stock at the particular physical location, etc.), as well as icon 412 that, when selected, causes the application to transition to showing details of the item in the e-commerce mode. That is, if the user were to select the icon 412, the application may present the details of the item as would be displayed by the service provider if the current physical location of the mobile device was not taken into account. In addition, the UI 400(2) includes, in this example, an icon 414 that, when selected, causes display of additional items that are related to the currently illustrated book and that are also available at the particular store of the service provider. In some instances, the UI 400(2) may display one or more related or recommended items that are available in-store without the need for selection of an icon.

Figure 5:
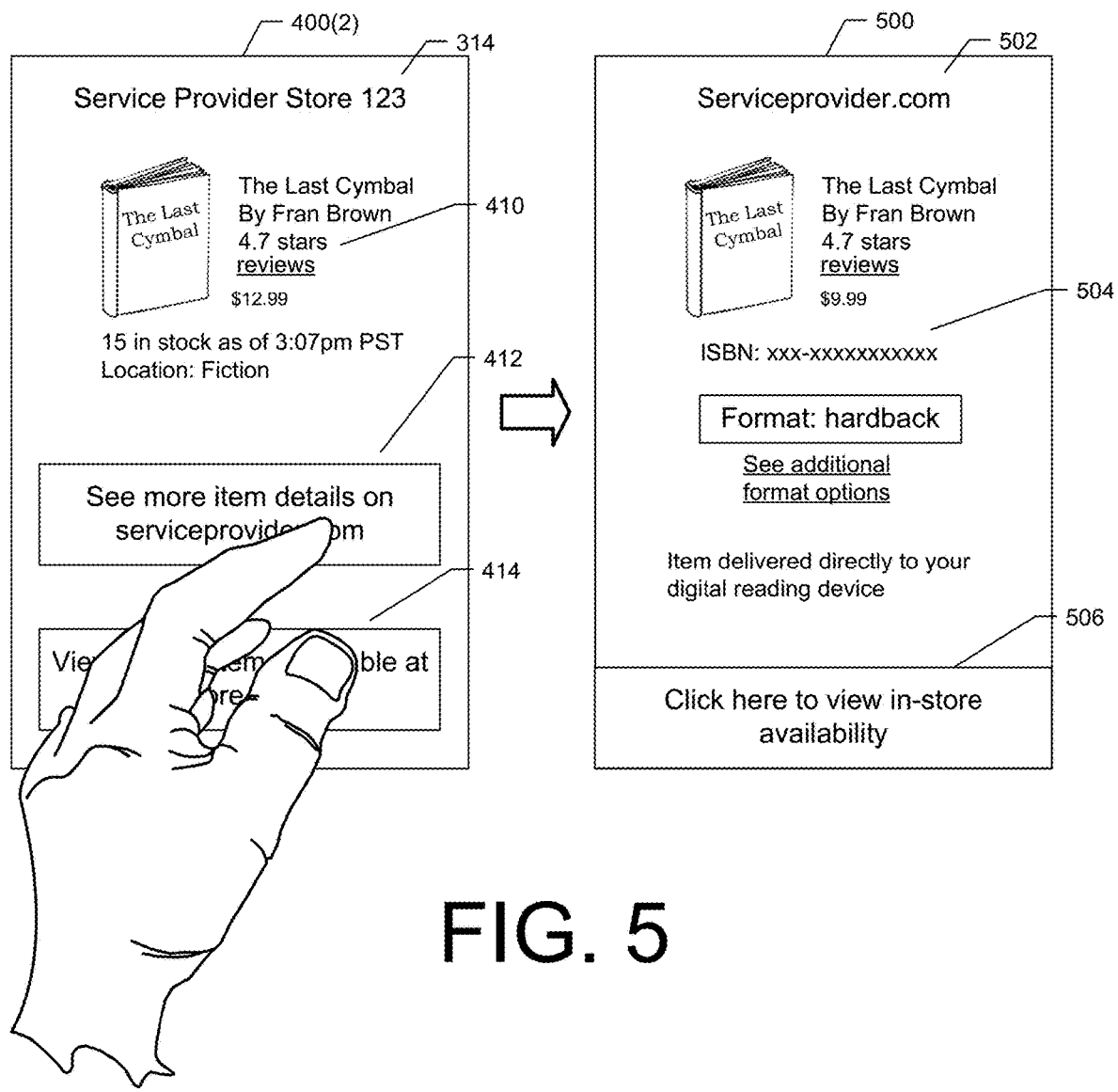
FIG. 5 illustrates a UI of an example item-detail page that the application may implement when operating in the in-store mode. In addition, this figure shows a UI of an example item-detail page that the application may implement in response to receiving a request to view details typically found when the application is executing in the e-commerce mode. In some instances, the second UI includes a UI element that is selectable to cause the application to revert back to displaying the first UI associated with the in-store mode.

FIG. 5 illustrates the UI 400(2) of the example item-detail page for the book "The Last Cymbal" that the application may display when operating in the in-store mode. In this example, the user selects the icon 412 to view additional details of the item in the first mode of operation (e.g., the e-commerce mode). In response to this selection, the application presents the UI 500, which includes an indication 502 that the results are associated with the online version of the application rather than the in-store version. In addition, the UI 500 includes details 504 regarding the particular item, with these details being different in part than the details of the item presented by the application when the initial search query was provided when operating in the in-store mode. For instance, the details 504 might not include the number of available copies of the book at the physical location of the service provider, nor the location of the book at the physical location (e.g., the section of the store at which the book is located). The details 504 may, however, include additional information not presented in the in-store mode, such as the ISBN number of the book, shipping options for the book, and the like. In addition, because the application is still operating in the in-store mode despite the user requesting to navigate to the online detail page, the UI 500 includes an icon 506 that is selectable to cause the application to re-present the UI 400(2) associated with the in-store details of the item.

Figure 6:
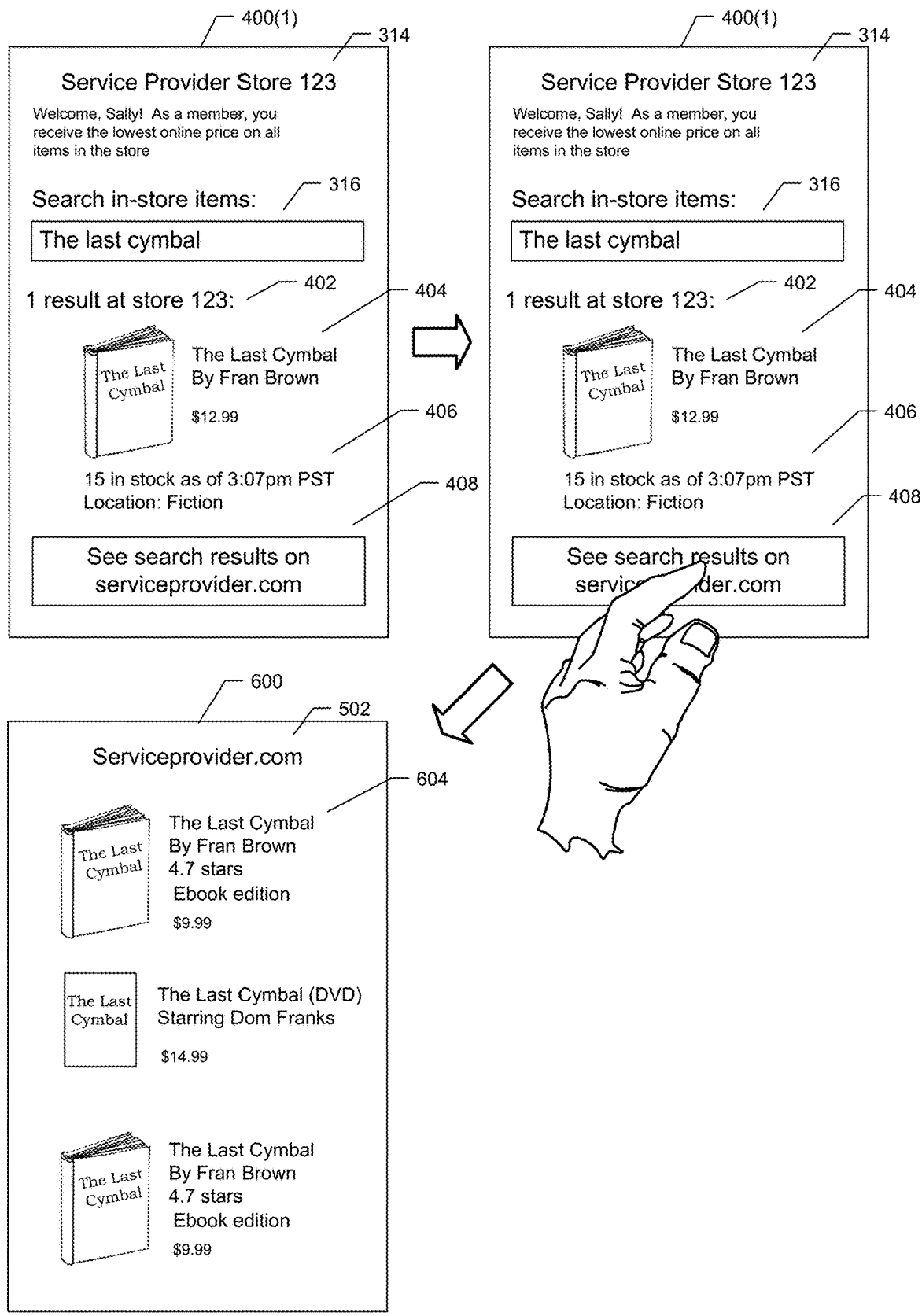
FIG. 6 illustrates another series of example UIs, including a first search results page that the application may implement when operating in the in-store mode. In this example, the user requests to view additional search results typically found when the application is executing in the e-commerce mode and, in response, the application displays another UI showing the additional search results.

FIG. 6 illustrates another series of example UIs, beginning with the previously discussed UI 400(1) comprising in-store search results for a particular search query. In this example, however, the user selects the icon 408 to view the search results of the query as if the application were operating in the e-commerce mode. In response, the application presents a UI 600, which includes search results for the example query "the last cymbal" as would be viewed without regard to the mobile device being located at the physical location 104(1) of the service provider. As illustrated, the UI 600 includes the search results 604 and may, in some instances, include an icon selectable to return to the UI 400(1) illustrating in-store search results.

Figure 7:
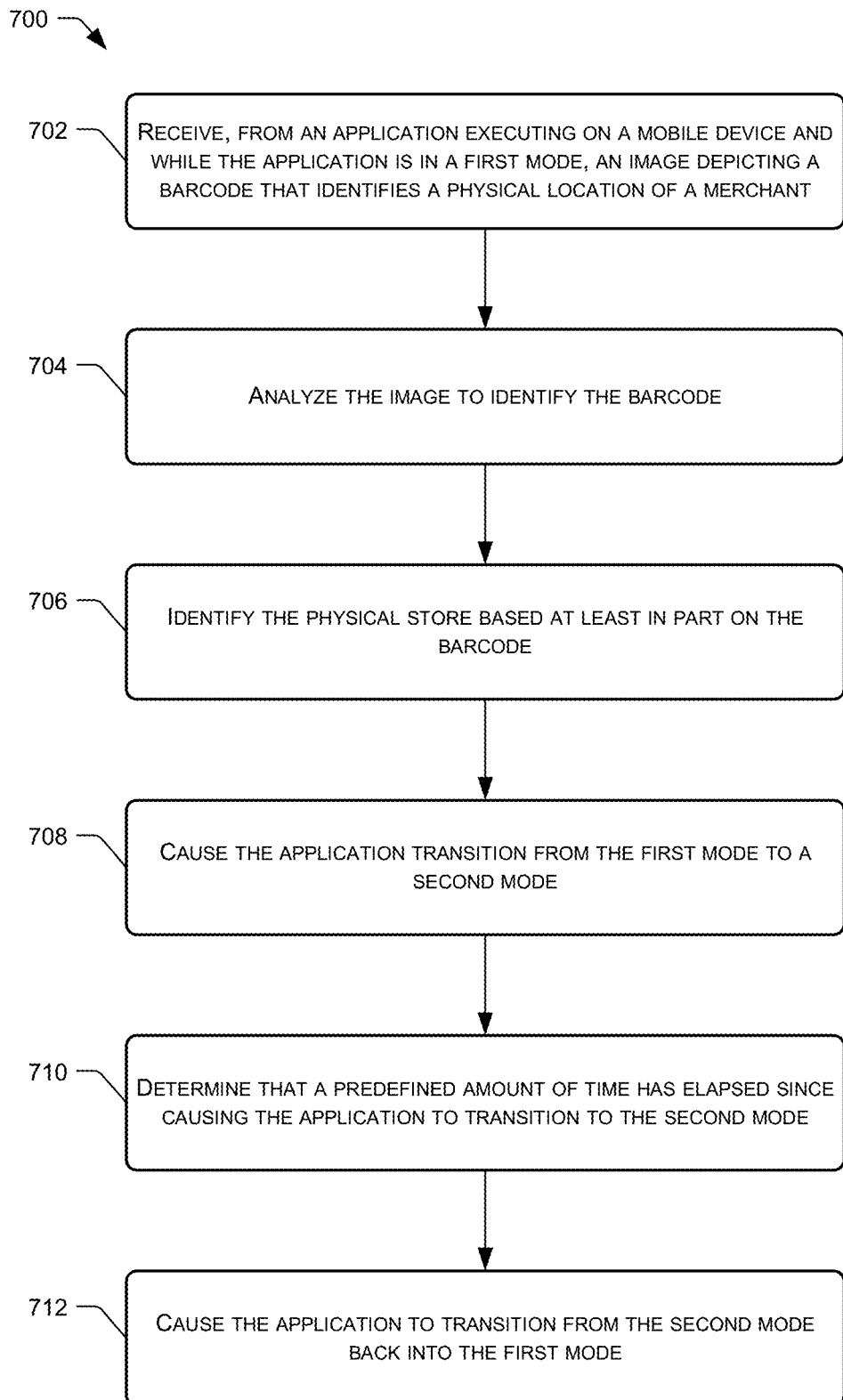
FIG. 7 illustrates a flow diagram of an example process for causing an application to transition from a first mode to a second mode for a predefined amount of time based on receiving an image that uniquely identifies a physical location of a service provider.

FIG. 7 illustrates a flow diagram of an example process 700 for causing an application to transition from a first mode to a second mode for a predefined amount of time based on receiving an image that uniquely identifies a physical location of a service provider. The process 700 may be implemented by the remote system 108, the local application 128, one or more other entities, or a combination thereof.

At 702, the process 700 includes receiving, from an application executing on a mobile device, and while the application is operating in a first mode, an image acquired by a camera of the mobile device, the image depicting a code that identifies a physical store associated with a merchant. For instance, a user of the mobile device may captured an image of a code or other unique identifier associated with a physical location of the service provider using the UI 300(3).

At 704, the process 700 analyzes the image to identify the code and, at 706, identifies the physical store based at least in part on the code. For instance, the remote system 108 may access the datastore 136 to determine that the particular illustrated code is associated with the particular physical location 104(1). At 708, the process 700 causes the application to transition from operating in the first mode to operating in a second mode. In some instances, the second mode may include one or more features unavailable in the first mode. For example, the second mode may present details that are specific to the physical location of the store, such as inventory details, locations of items at the store, recommended items available at the store, and the like. For instance, when a search query is received from the mobile device when operating in the second mode, items may be identified that both correspond to the search query and are available in-store. In addition to causing the application to transition to the second mode, in some instances the process 700 may also set a local or a remote timer for a predefined amount of time for the purpose of determining when to cause the application to transition back to the first mode.

At 710, the process 700 determines that the predefined amount of time has elapsed since causing the application to transition from operating in the first mode to operating in the second mode and, at 712, the process 700 causes the application to transition from operating in the second mode back to operating in the first mode based at least in part on determining that the predefined amount of time has elapsed.

Figure 8:
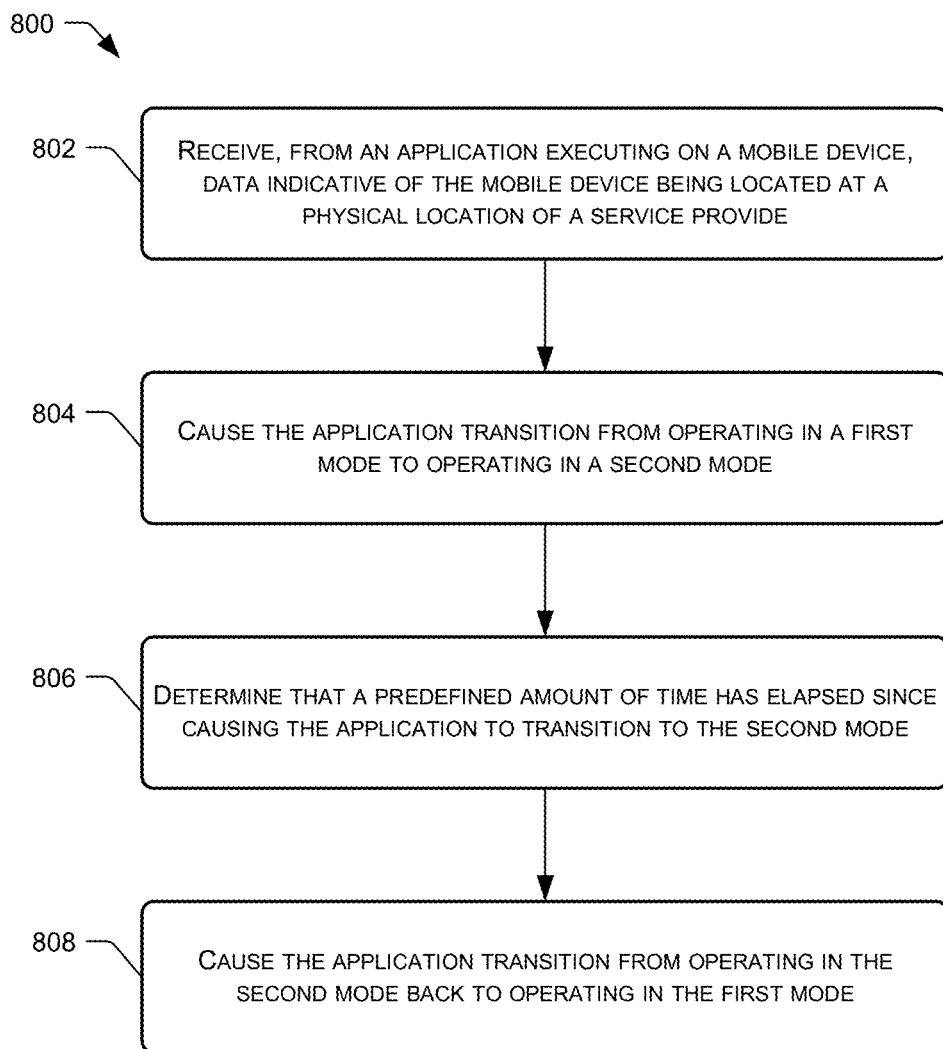
FIG. 8 illustrates a flow diagram of an example process for causing an application to transition from a first mode to a second mode for a predefined amount of time based on receiving an input indicating that a mobile device is located a physical location of a service provider.

FIG. 8 illustrates a flow diagram of an example process 800 for causing an application to transition from a first mode to a second mode for a predefined amount of time based on receiving an input indicating that a mobile device is located a physical location of a service provider. The process 800 may be implemented by the remote system 108, the local application 128, one or more other entities, or a combination thereof.

At 802, the process 800 includes receiving, from a mobile device executing an application associated with a service provider, data indicative of the mobile device being located at a physical location associated with the service provider. This data may be based on an image captured by a camera of the mobile device, based on selection of an icon by a user of the mobile, based on location data received from the mobile device or another device, or the like. At 804, the process 800 causes the application to transition from operating in a first mode to operating in a second mode, wherein the second mode includes one or more features unavailable in the first mode. For example, when the mobile device presents details about a first item available in-store, the application may identify a second that is also available in-store and, potentially, related to the first item and/or recommended for the user, and may present details regarding this second, in-store item.

At 806, the process 800 further includes determining that a predefined amount of time has elapsed since causing the application to transition from operating in the first mode to operating in the second mode. At 808, and at least partly in response to determining that the amount of time has elapsed, the process 800 causes the application to transition from operating in the second mode back to operating in the first mode.

Figure 9:
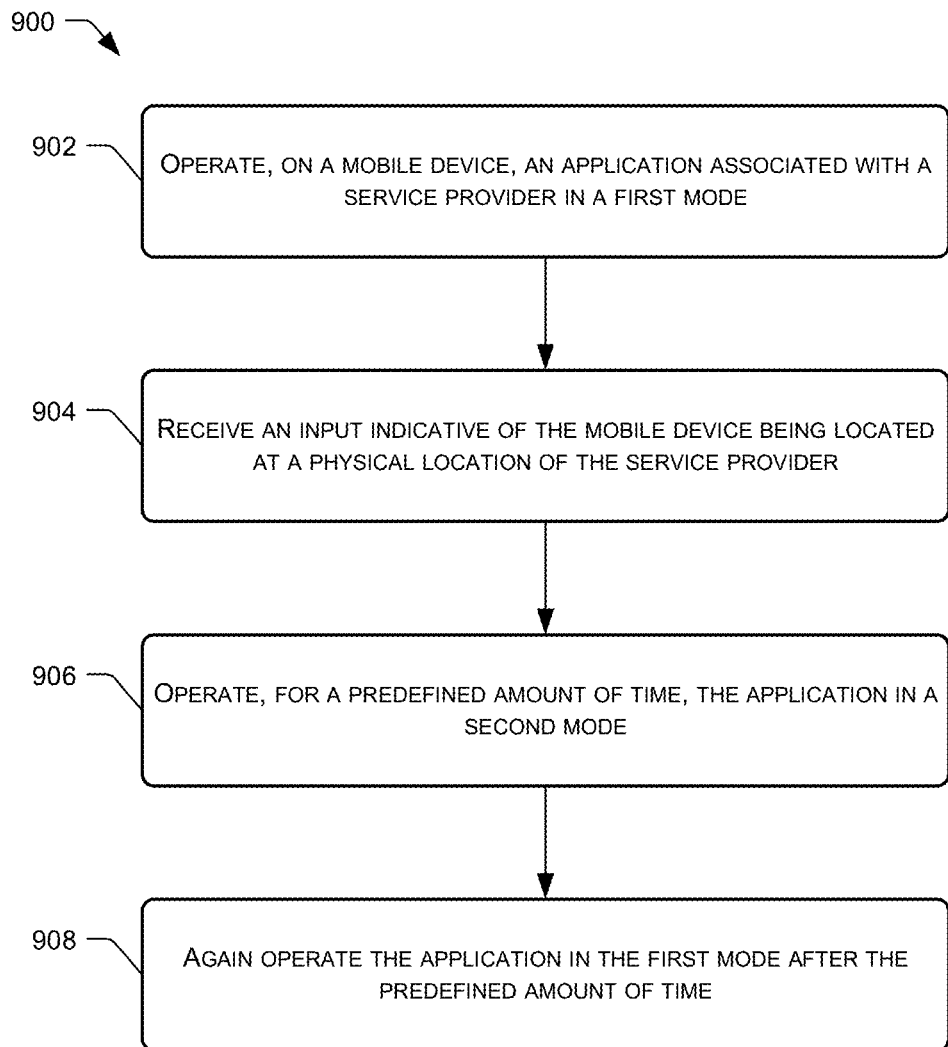
FIG. 9 illustrates a flow diagram of an example process that may be implemented by a mobile device when an indication is received indicating that the mobile device is located at a physical location of a service provider.

FIG. 9 illustrates a flow diagram of an example process 900 that may be implemented by a mobile device when an indication is received indicating that the mobile device is located at a physical location of a service provider. The process 900 may be implemented by the remote system 108, the local application 128, one or more other entities, or a combination thereof. At 902, the process 900 includes operating an application in a first mode, the application being associated with a service provider. At 904, the process 900 receives an input indicative of the mobile device being located at a physical location associated with the service provider. Again, this input may be provided based on the capturing of a unique image or other content associated with the physical location, a user manually checking in using a GUI or VUI, or the like. At 906, the process 900 operates, for a predefined amount of time, the application in a second mode at least partly in response to receiving the input indicative of the mobile device being located at the physical location associated with the service provider. Finally, at 908, the process 900 again operates the application in the first mode after the predefined amount of time has elapsed.

The processes discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, from an application executing on a mobile device, and while the application is operating in an e-commerce mode, an image acquired by a camera of the mobile device, the image depicting a code that identifies a physical store associated with a merchant, wherein the e-commerce mode includes one or more first prices of items presented in the e-commerce mode;
analyzing the image to identify the code;
identifying the physical store based at least in part on the code;
causing the application to transition from operating in the e-commerce mode to operating in an in-store mode based at least in part on identifying the physical store, wherein the in-store mode includes one or more features that are based at least in part on an inventory of items available at the physical store, the one or more features including one or more second prices of the inventory of items available at the physical store, the one or more second prices being different from the one or more first prices;
determining that a predefined amount of time has elapsed since causing the application to transition from operating in the e-commerce mode to operating in the in-store mode; and
causing the application to transition from operating in the in-store mode back to operating in the e-commerce mode based at least in part on determining that the predefined amount of time has elapsed.

2. The method as recited in claim 1, further comprising:
receiving, from the application, and while the application is operating in the e-commerce mode, a first search query;
identifying one or more first items that are associated with the first search query and are available for acquisition from the merchant via the application;
causing the application to display, on the mobile device, information regarding the one or more first items;
receiving, from the application, and while the application is operating in the in-store mode, a second search query;
identifying one or more second items that are associated with the second search query and are available for acquisition from the merchant at the physical store; and
causing the application to display, on the mobile device, information regarding the one or more second items.

3. The method as recited in claim 1, wherein the application comprises a first application and the mobile device comprises a first mobile device, and further comprising:
receiving, from a second application executing on a second mobile device, and while the second application is operating in the e-commerce mode, an indication that a user of the second mobile device has selected, via a user interface (UI) of the second application, an icon associated with the physical store;
causing the second application to transition from operating in the e-commerce mode to operating in the in-store mode based at least in part on receiving the indication;
determining that the predefined amount of time has elapsed since causing the second application to transition from operating in the e-commerce mode to operating in the in-store mode; and
causing the second application to transition from operating in the in-store mode back to operating in the e-commerce mode based at least in part on determining that the predefined amount of time has elapsed since causing the second application to transition from operating in the e-commerce mode to operating in the in-store mode.

4. The method as recited in claim 1, wherein the application comprises a first application and the mobile device comprises a first mobile device, and further comprising:
determining that a second mobile device executing a second application is located within a threshold proximity of the physical store;
causing the second application to transition from operating in the e-commerce mode to operating in the in-store mode based at least in part on determining that the second mobile device is located within the threshold proximity of the physical store;
determining that the second mobile device is located outside of the threshold proximity of the physical store; and
causing the second application to transition from operating in the in-store mode back to operating in the e-commerce mode.

5. A method comprising:
receiving, from a mobile device executing an application associated with a service provider, data indicative of the mobile device being located at a physical location associated with the service provider;
causing the application to transition from operating in an e-commerce mode to operating in an in-store mode based at least in part on receiving the data indicative of the mobile device being located at the physical location, wherein the in-store mode includes one or more first prices of an inventory of items available at the physical location, the one or more first prices being different from one or more second prices of items presented in the e-commerce mode;
determining that a predefined amount of time has elapsed since causing the application to transition from operating in the e-commerce mode to operating in the in-store mode; and
causing the application to transition from operating in the in-store mode back to operating in the e-commerce mode.

6. The method as recited in claim 5, wherein the receiving the data comprises receiving an image captured by a camera of the mobile device, the image comprising an identifier of the physical location, and further comprising:
analyzing the image to recognize the identifier; and
identifying the physical location of multiple physical locations associated with the service provider based at least in part on the identifier.

7. The method as recited in claim 5, wherein the receiving the data comprises receiving an indication that a user interface (UI) element associated with the physical location has been selected from a UI of the application of the mobile device, the UI including multiple UI elements associated with respective physical locations associated with the service provider.

8. The method as recited in claim 5, wherein the receiving the data comprises receiving global positioning system (GPS) data acquired via a GPS unit of the mobile device, the GPS data indicative of a geographical location of the mobile device, and further comprising determining that the geographical location of the mobile device is within a threshold proximity of the physical location of the service provider.

9. The method as recited in claim 5, further comprising:
receiving, from the application and while the application is operating in the e-commerce mode, a first request for information associated with a particular item;

sending first item data for displaying on the mobile device, the first item data comprising first details associated with the particular item;

receiving, from the application and while the application is operating in the in-store mode, a second request for information associated with the particular item; and sending second item data for displaying on the mobile device, the second item data comprising second details associated with the particular item, an amount of the second details associated with the particular item being less than an amount of the first details associated with the particular item.

10. The method as recited in claim 5, further comprising:

receiving, from the application and while the application is operating in the in-store mode, a first request for information associated with a first item;

identifying a second item that is available at the physical location of the service provider; and causing the mobile device to display one or more first details associated with the first item and one or more second details associated with the second item.

11. The method as recited in claim 5, further comprising:

when the application is operating in the e-commerce mode, sending, to the application, information regarding details of first items available for acquisition from the service provider via the application; and when the application is operating in the in-store mode, sending, to the application, information regarding details of second items available for acquisition from the service provider at the physical location.

12. The method as recited in claim 11, further comprising, when the application is operating in the in-store mode and while the application presents information that is not unique to the physical location of the service provider, causing the mobile device to display a user interface (UI) element, selection of which causes the application to present information determined based on the physical location of the service provider.

13. A mobile device comprising:

one or more processors; and one or more computer-readable media storing computer-executable instructions that, when executed on the one or more processors, cause the one or more processors to perform acts comprising:

operating an application in an e-commerce mode, the application being associated with a service provider, wherein the e-commerce mode includes first price information of an item available from the service provider;

receiving an input indicative of the mobile device being located at a physical location associated with the service provider;

operating, for a predefined amount of time, the application in an in-store mode at least partly in response to receiving the input indicative of the mobile device being located at the physical location associated with the service provider, wherein the in-store mode includes an indication that the item is available at the physical location associated with the service provider and second price information of the item, the second price information being different from the first price information; and again operating the application in the e-commerce mode after the predefined amount of time has elapsed.

14. The mobile device as recited in claim 13, the acts further comprising:

setting a timer for the predefined amount of time at least partly in response to receiving the input indicative of the mobile device being located at the physical location associated with the service provider; and determining, via the timer, that the predefined amount of time has lapsed.

15. The mobile device as recited in claim 13, the acts further comprising:

sending, to a remote device, a first indication of the input indicative of the mobile device being located at the physical location associated with the service provider; and receiving, from the remote device, a second indication that the predefined amount of time has elapsed.

16. The mobile device as recited in claim 13, further comprising a camera, and wherein the receiving the input indicative of the mobile device being located at the physical location associated with the service provider comprises capturing, using the camera an image that includes an identifier of the physical location associated with the service provider.

17. The mobile device as recited in claim 13, further comprising a display, and wherein the receiving the input indicative of the mobile device being located at the physical location associated with the service provider comprises receiving a selection of a user interface (UI) element presented on the display of the mobile device, the UI element identifying the physical location of the service provider.

18. The mobile device as recited in claim 13, the acts further comprising:

sending, while the application is operating in the e-commerce mode, a first request for information associated with a particular item;

receiving first item data for displaying on the mobile device, the first item data comprising first details associated with the particular item;

sending, while the application is operating in the in-store mode, a second request for information associated with the particular item; and receiving second item data for displaying on the mobile device, the second item data comprising second details associated with the particular item, an amount of the second details associated with the particular item being less than an amount of the first details associated with the particular item.

19. The mobile device as recited in claim 13, the acts further comprising:

receiving, while the application is operating in the e-commerce mode, information regarding details of first items available for acquisition from the service provider via the application; and receiving, while the application is operating in the in-store mode, information regarding details of second items available for acquisition from the service provider at the physical location.

20. The mobile device as recited in claim 13, the acts further comprising presenting, while the application is operating in the in-store mode and while the application presents information that is not unique to the physical location of the service provider, a user interface (UI) element, selection of which causes the application to present information determined based on the physical location of the service provider.

* * * * *